United States Patent
Lhost et al.

(10) Patent No.: US 6,359,085 B1
(45) Date of Patent: Mar. 19, 2002

(54) PROCESS FOR PRODUCTION OF ETHYLENE POLYMERS

(75) Inventors: Olivier Lhost, Howré; Nicole Dewaele, Brussels; Martine Frederickx, Ophain Bois-Seigneur Isaac; Joel Kaisin, Ligny, all of (BE)

(73) Assignee: Solvay Polyolefins Europe - Belgium, Brussels (BE)

( * ) Notice: Subject to any disclaimer, the term of this patent is extended or adjusted under 35 U.S.C. 154(b) by 0 days.

(21) Appl. No.: 09/522,845

(22) Filed: Mar. 10, 2000

(30) Foreign Application Priority Data

Mar. 23, 1999 (BE) .......................................... 09900203

(51) Int. Cl.$^7$ .................................................. C08F 4/22
(52) U.S. Cl. ........................ 526/106; 526/352; 526/348; 526/129
(58) Field of Search ................................ 526/106, 129, 526/348, 352

(56) References Cited

U.S. PATENT DOCUMENTS 3,900,457 A * 8/1975 Witt ...................... 260/94.9 D
4,151,122 A * 4/1979 McDaniel et al. .......... 252/458
5,408,015 A    4/1995 Hsieh et al.

FOREIGN PATENT DOCUMENTS

| EP | 0 849 293 A |   | 6/1998 |
| EP | 0 882 740   | * | 9/1998 |
| EP | 0 882 740 A |   | 12/1998 |

* cited by examiner

*Primary Examiner*—David W. Wu
*Assistant Examiner*—Ling-Siu Choi
(74) *Attorney, Agent, or Firm*—Venable; Marina V. Schneller

(57) ABSTRACT

The invention relates to a process for the production of ethylene polymers by the polymerization of ethylene or the copolymerization of ethylene with one or more $C_3$ to $C_8$ olefins in contact with a chromium-based catalyst deposited on a support essentially consisting of silica. According to the invention, the chromium catalyst is subjected in succession to a heat treatment in nitrogen and then to a heat treatment in air under defined temperature conditions before bringing it into contact with ethylene and, optionally, one or more olefins under polymerizing conditions. The process of the invention makes it possible to manufacture ethylene polymers having an improved compromise between processability, stiffness and resistance to slow crack growth.

9 Claims, No Drawings

PROCESS FOR PRODUCTION OF ETHYLENE POLYMERS

The present invention relates to a process for the production of ethylene polymers by the polymerization of ethylene or the copolymerization of ethylene with one or more olefins using a chromium-based catalyst deposited on silica. It relates more particularly to a process for producing ethylene polymers having an improved compromise between stiffness, processability and resistance to slow crack growth.

It is well known to produce ethylene polymers (homopolymers and copolymers) by the use, in ethylene (co)polymerization of chromium-based catalysts deposited on a silica-based support. It is also known that the activity of such catalysts can be improved by subjecting them to a heat treatment in air at high temperature. These activated catalysts are very suitable for producing ethylene polymers which combine low melt flow indices (that is to say high average molecular masses) with high densities. Ethylene polymers having a high density generally have a high stiffness, thereby making it possible to reduce the weight of articles fashioned therefrom without a significant loss of mechanical properties. However, the increase in stiffness is generally to the detriment of the resistance to slow crack growth. For many applications of ethylene polymers, such as hollow bodies and pipes intended to contain or transport various liquids and fluids, it is paramount to have available polymers which exhibit both a high stiffness and a high resistance to slow crack growth.

Patent Application EP-A-882,740 describes means for improving the crack resistance of ethylene polymers obtained using chromium- and titanium-based catalysts deposited on supports comprising silica. This result is achieved by the use, for ethylene (co)polymerization, of a catalyst produced as follows: chromium deposition on the support, dehydration of a chromium-based catalyst by heating in an atmosphere of dry inert gas at a temperature of at least 300° C., titanation of the chromium-based catalyst by bringing it into contact with a titanium compound at a temperature of 300° C. at least in an atmosphere of dry inert gas and, finally, activation of the titanated chromium-based catalyst by heat treatment in dry air at a temperature of 500 to 900° C. The purpose of the step of dehydrating the chromium-based catalyst is to prevent the formation of $TiO_2$ by the reaction of water with the titanium compound during the subsequent titanation step.

The object of the present invention is to provide a process for the production of ethylene polymers using a chromium-based catalyst deposited on a support essentially consisting of silica, which exhibit a good compromise between processability, rigidity and resistance to slow crack growth.

For this purpose, the invention relates to a process for the production of ethylene polymers by the polymerization of ethylene or the copolymerization of ethylene with one or more $C_3$ to $C_8$ olefins in contact with a chromium-based catalyst deposited on a support essentially consisting of silica, in which process the chromium-based catalyst deposited on the silica is subjected in succession to a heat treatment in nitrogen at a temperature greater than 350° C. and less than 850° C. and then to a heat treatment in air at a temperature greater than 350° C. and less than 800° C. before it is brought into contact with the ethylene and, optionally, one or more olefins under polymerizing conditions for producing an ethylene polymer.

The invention is based on the surprising observation that the heat treatment in nitrogen, under the thermal conditions defined above, prior to the conventional thermal activation in air of a chromium-based catalyst deposited on a support essentially consisting of silica, contributes to improving the compromise between stiffness, processability and resistance to slow crack growth of the ethylene polymers produced. The process according to the invention consequently allows, in particular, the production of ethylene polymers having a markedly improved resistance to slow crack growth for a given stiffness and given processability. As a corollary, it allows the production of ethylene polymers with a higher density, and therefore a higher stiffness, without an appreciable reduction in the resistance to slow crack growth.

The heat treatments, in nitrogen and in air respectively, are preferably carried out at a temperature which is at least 480° C. and, moreover, does not exceed 760° C. Excellent results are obtained when the heat treatments, in nitrogen and in air respectively, are carried out at a temperature which is at least 530° C. and does not exceed 715° C. It is understood that the heat treatment in nitrogen and the heat treatment in air must not be carried out at the same temperature. Preferably, the temperature of the heat treatment in air does not exceed that of the heat treatment in nitrogen. Advantageously, similar, but not identical, temperatures are used for the two successive heat treatments.

The duration of the heat treatment in nitrogen is not critical. In general, it will be between a few minutes and a few hours, usually between 10 minutes and 20 hours. Excellent results are obtained with durations of heat treatment in nitrogen ranging from 6 to 16 hours. Likewise, the duration of the heat treatment in air is not critical. Usually, it will between 5 minutes and 6 hours. Excellent results are obtained with durations of heat treatment in air ranging from 30 minutes to 2 hours.

The heat treatment in nitrogen and in air of the chromium-based catalyst supported on silica may be carried out using any known method for bringing gases and solids into contact with each other, such as in a static bed or a fluidized bed. Advantageously, these heat treatments take place over a fluidized bed, the supported catalyst being kept in the fluidized state by means of the gases, nitrogen and air respectively, used in the two heat treatment steps.

The rise in temperature, up to the temperature of the heat treatment in nitrogen, is advantageously accompanied by flushing by means of a non-oxidizing gas such as, for example, nitrogen, carbon monoxide, hydrogen and mixtures thereof. Preferably, it is accompanied while flushing with nitrogen.

At the end of the heat treatment in air, the catalyst is, in a known manner, cooled down to room temperature for the purpose of recovering it and storing it under the protection of nitrogen until it is used for the polymerization. To do this, the air may be replaced with nitrogen at the end of the heat treatment in air and the temperature of the catalyst may be gradually reduced down to room temperature while flushing with nitrogen. A preferred method of implementation consists in cooling the catalyst gradually in air, generally down to a temperature of between 300 and 400° C., advantageously down to approximately 350° C., and then continuing the cooling down to room temperature, keeping the catalysts flushed with nitrogen before recovering and storing it under a protection of nitrogen.

The support for the chromium-based catalyst used in the process of the invention essentially consists of silica, that is to say it is substantially free of other oxides. The silica content of these supports is generally at least 99.9% by weight.

In general, the silica support has a specific surface area ranging from 100 to 800 $m^2/g$, measured according to the BET volumetric method in British Standard BS 4359/1 (1984). Usually, the specific surface area does not exceed 500 m²/g. Preferably, it ranges from 150 to 400 m²/g.

Moreover, the silica support generally has a pore volume of approximately 0.5 to 4 cm³/g. Preferably, the pore volume is approximately 1 to 3 cm³/g. The term "pore volume" should be understood to mean the pore volume measured according to the nitrogen penetration method (BET) with reference to British Standard BS 4359/1 (1984).

The chromium-based catalyst deposited on a support essentially consisting of silica used in the process according to the invention usually contains approximately 0.1 to 5% by weight and even more particularly 0.5 to 1.5% by weight of chromium (these weights being expressed with respect to the weight of supported catalyst). Of course, it is possible to use mixtures of chromium-based catalysts deposited on supports essentially consisting of silica.

The way in which the silica-supported chromium catalyst is obtained is not critical. By way of non-limiting examples of chromium-catalysts deposited on a support essentially consisting of silica that can be used in the process of the invention, mention may be made of the commercial catalysts EP30X (sold by Crosfield) and HA 30W (sold by Grace Davison).

According to the invention, the silica-supported chromium catalysts having undergone successive heat treatments in nitrogen and in air, under suitable conditions of temperature and duration, are used for the polymerization of ethylene or for its copolymerization with $C_3$ to $C_8$ olefins. By way of examples of olefins that can be used as comonomers, mention may be made of propylene, 1-butene, 4-methyl-1-pentene, 1-hexene and 1-octene. Of course, several olefins may be used simultaneously.

The process according to the invention applies particularly well to the manufacture of ethylene homopolymers and of copolymers containing at least 90 mol% ethylene, and especially random copolymers and terpolymers of ethylene with 1-butene and/or 1-hexene or even of block copolymers obtained by the sequential polymerization of mixtures of ethylene and of butene and/or hexene.

The (co)polymerization is carried out, in a known manner, by bringing ethylene and, optionally, other olefins into contact with the catalyst under polymerizing conditions known per se. The (co)polymerization of the ethylene may be carried out using any known process—in solution in a solvent, in suspension in a hydrocarbon diluent or in the gas phase. Advantageously, it is carried out in suspension in an inert diluent, such as isobutane. Typically, the polymerization temperature is between 20 and 130° C. and the pressure is between atmospheric pressure and $100 \times 10^5$ Pa, preferably between $10 \times 10^5$ and $55 \times 10^5$ Pa.

The ethylene polymers produced according to the process of the present invention exhibit an excellent compromise between stiffness, processability and resistance to slow crack. They may be used in any conventional process for converting thermoplastics, such as, for example, extrusion and extrusion-blow moulding. They are very suitable for the extrusion-blow moulding of hollow bodies and for the extrusion of pipes, in particular for the extrusion-blow moulding of hollow bodies such as hollow bodies of reduced weight ("lightweighting").

The examples which follow are intended to illustrate the process of the invention.
The meaning of the symbols used in these examples and, where appropriate, the units expressing the parameters mentioned and the methods of measuring these parameters are explained below:

HLMI: melt flow index of the polyethylene measured under a load of 21.6 kg at 190° C., exposed in g/10 min and measured according to the ASTM D 1238 (1986) standard;

SD: standard density of the ethylene polymer expressed in kg/m³ and measured according to the ISO 1183 (1987) standard;

$\mu_2$: capillary viscosity measured at 190° C. using a 30/2 die at a shear rate of 100 s$^{-1}$ expressed in poise;

$\eta_i$: inherent viscosity, expressed in l/g;

ESCR: resistance to slow crack growth, expressed in hours, measured according to the ASTM D 1693-70 (1988) standard, under conditions A, by immersing a plaque, obtained according to the ASTM D 1928-90 standard by compression-moulding a plaque, in an aqueous solution containing 10% by volume of nonylphenoxy poly(ethyleneoxy) ethanol at 50° C.

Examples 1 to 3 relate to the homopolymerization of ethylene in isobutane. Examples 4 and 5 relate to the copolymerization of ethylene and hexene in isobutane.
In Example 1 (according to the invention) and Example 2 (comparative example), a mixture of two commercial chromium-based catalysts is used, this being deposited on a support essentially consisting of silica, containing 60% by weight of the catalyst EP30X and 40% by weight of the catalyst HA30W. In Examples 3 and 4 (according to the invention), and in Example 5 (comparative example), the catalyst EP30X was used by itself.

Examples 1, 3 and 4 illustrate successive heat treatments of the catalyst in nitrogen and in air. Examples 2 and 5 (comparative examples) illustrate a treatment in air alone.

EXAMPLE 1

1.1. Treatment of the Catalyst

The following successive treatment steps are carried out in a fluidized-bed reactor on 15 g of catalyst (see above):

increasing the temperature up to 705° C. (at a rate of 10° C./min.) while flushing with nitrogen;

holding the temperature at 705° C. while flushing with nitrogen for 15 hours;

substituting the nitrogen with air;

holding the temperature at 705° C. while flushing with air for 1 hour;

reducing the temperature down to 350° C. (at a rate of −10° C./min.), while flushing with air substituting the air with nitrogen;

holding the temperature at 350° C. while flushing with nitrogen for 40 minutes;

reducing the temperature (at a rate of −10° C./min.), down to room temperature while flushing with nitrogen;

recovering the catalyst under a protection of nitrogen for the purpose of using it for the polymerization.

The activated catalyst has the following properties:

specific surface area measured by BET: 324 m²/g;

pore volume measured by nitrogen penetration (BET): 1.59 cm³/g;

Cr$^{VI}$ content: 7.1 g Cr/kg of catalyst.

1.2. Polymerization of Ethylene

Introduced into a predried 3-liter autoclave fitted with a stirrer are 194 mg of the activated catalyst, obtained accord ing to the procedure described above in item 1.1, and 1 liter of isobutane. The temperature is raised to 103° C. and ethylene is introduced into the autoclave so that the ethylene content in the liquid isobutane reaches 7 mol %. The ethylene pressure and the temperature are then held constant for 139 minutes in order to produce 472 g of polyethylene. After degassing, the polymer is recovered in the form of particles of fluff. The collected polyethylene has the following properties:

HLMI=7.1 g/10 min.;
SD=959.1 kg/m$^3$;
$\mu_2$=25,400 poise;
$\eta_i$=0.280 l/g;
ESCR=76 h

EXAMPLE 2

Comparative Example 2.1. Treatment of the Catalyst

The following successive treatment steps are carried out in a fluidized-bed reactor on 15 g of catalyst identical to that used in Example 1 (see above):

increasing the temperature up to 705° C. (at a rate of 10° C./min) while flushing with air;

holding the temperature at 705° C. while flushing with air for 16 hours;

reducing the temperature down to 350° C. (at a rate of −10° C./min), while flushing with air;

substituting the air with nitrogen;

holding the temperature at 350° C. while flushing with nitrogen for 40 minutes;

reducing the temperature (at a rate of −10° C./min) down to room temperature while flushing with nitrogen;

recovering the catalyst under a protection of nitrogen for the purpose of using it for the polymerization.

The activated catalyst has the following properties:

specific surface area measured by BET: 307 m$^2$/g;
pore volume measured by nitrogen penetration (BET): 1.68 cm$^3$/g;
Cr$^{VI}$ content: 7.3 g Cr/kg of catalyst.

2.2. Polymerization of Ethylene

Introduced into a predried 3-liter autoclave fitted with a stirrer are 157 mg of the activated catalyst, obtained according to the procedure described above in item 2.1, and 1liter of isobutane. The temperature is raised to 103° C. and ethylene is introduced into the autoclave so that the ethylene content in the liquid isobutane reaches 7 mol %. The ethylene pressure and the temperature are then held constant for 171 minutes in order to produce 426 g of polyethylene. After degassing, the polymer is recovered in the form of particles of fluff. The collected polyethylene has the following properties:

HLMI=7.5 g/10 min.;
SD=959.1 kg/m$^3$;
$\mu_2$=25,000 poise;
$\eta_i$=0.266 l/g;
ESCR=27.5 hours

EXAMPLE 3

3.1. Treatment of the Catalyst

The successive treatment steps described in Example 1 (heat treatment in nitrogen at 705° C. for 15 hours and heat treatment in air at 705° C. for 1 hour) are carried out in a fluidized-bed reactor on 15 g of the commercial catalyst EP30X.

The activated catalyst has the following properties:

specific surface area measured by BET: 271 m$^2$/gl;

pore volume measured by nitrogen penetration (BET): 1.72 cm$^3$/g;

Cr$^{VI}$ content: 7.1 g Cr/kg of catalyst.

3.2. Polymerization of Ethylene

Introduced into a predried 3-liter autoclave fitted with a stirrer are 164 mg of the activated catalyst, obtained according to the procedure described above in item 3.1, and 1 liter of isobutane. The temperature is raised to 106° C. and ethylene is introduced into the autoclave so that the ethylene content in the liquid isobutane reaches 7 mol %. The ethylene pressure and the temperature are then held constant for 181 minutes in order to produce 442 g of polyethylene. After degassing, the polymer is recovered in the form of particles of fluff. The collected polyethylene has the following properties:

HLMI=26 g/10 min.;
SD=959.5 kg/m$^3$;
$\mu_2$=16,500 poise;
$\eta_i$=0.227 /g;
ESCR=70.1 h Comparing the results of Examples 1 and 3 according to the invention, and in particular those of Example 1, with those of Comparative Example 2 clearly shows the improvement in the compromise between stiffness, processability and resistance to slow crack growth of the ethylene homopolymers produced according to the process of the present invention and, in this case, the improvement in the resistance to slow crack growth for similar stifnesses and process abilities.

EXAMPLE 4

4.1. Treatment of the Catalyst

The successive treatment steps described in Example 1 (heat treatment in nitrogen at 705° C. for 15 hours and heat treatment in air at 705° C. for 1 hour) are carried out in a fluidized-bed reactor on 15 g of the commercial catalyst EP30X.

The activated catalyst has the following properties:

specific surface area measured by BET: 276 m$^2$/gl;

pore volume measured by nitrogen penetration (BET): 1.70 cm$^3$/g;

Cr$^{VI}$ content: 7.2 g Cr/kg of catalyst.

4.2. Copolymerization of Ethylene

Introduced into a predried 5-liter autoclave fitted with a stirrer are 243 mg of the catalyst obtained according to the procedure described in item 4.1 above and 1.5 liters of isobutane. The temperature is raised to 106° C. and ethylene and hexene are introduced into the autoclave so that the ethylene content in the liquid isobutane reaches 7 mol % and the hexene/ethylene molar ratio is 0.02. The ethylene pressure and the temperature are then held constant for 170 minutes in order to produce 611 g of polyethylene. After degassing, the polymer is recovered in the form of particles of fluff. The ethylene copolymer collected has the following properties:

HLMI=18.3 g/10 min.;
SD=956.8 kg/m$^3$;
$\mu_2$=19,000 poise;
$\eta_i$=0.229 l/g;
ESCR=44.8 h

EXAMPLE 5

Comparative Example

5.1. Treatment of the Catalyst

The successive treatment steps described in Example 2 (heat treatment in air at 705° C. for 16 hours) are carried out in a fluidized-bed reactor on 15 g of the commercial catalyst EP30X.

The activated catalyst has the following properties:

specific surface area measured by BET: 258 m$^2$/g;

pore volume measured by nitrogen penetration (BET): 1.77 cm$^3$/g;

Cr$^{VI}$ content: 5.9 g Cr/kg of catalyst.

5.2. Copolymerization of Ethylene

Introduced into a predried 5-liter autoclave fitted with a stirrer are 232 mg of the catalyst obtained according to the procedure described in item 5.1 above and 1.5 liters of isobutane. The temperature is raised to 103° C. and ethylene and hexene are introduced into the autoclave so that the ethylene content in the liquid isobutane reaches 7 mol % and the hexene/ethylene molar ratio is 0.02. The ethylene pressure and the temperature are then held constant for 193 minutes in order to produce 564 g of polyethylene. After degassing, the polymer is recovered in the form of particles of fluff. The ethylene copolymer collected has the following properties:

HLMI=16.8 g/10 min.;

SD=956.5 kg/m$^3$;

$\mu_2$=18,400 poise;

$\eta_i$=0.223 l/g;

ESCR=36.6 h

Comparing the results of Example 4 according to the invention with those of Example 5 (comparative example) shows the improvement in the compromise between stiffness, processability and resistance to slow crack growth of the ethylene copolymers produced according to the process of the invention and, in this case, the improvement in the resistance to slow crack growth for similar stifnesses and processabilities.

It should be understood that the process according to the invention also makes it possible to produce ethylene polymers having higher stiffnesses (as revealed by higher SD values) for given values of processability and of resistance to slow crack growth.

What is claimed is:

1. Process for the production of an ethylene polymer or copolymer comprising contacting ethylene alone or in combination with one or more C$_3$ to C$_8$ olefins, under polymerization conditions, with a chromium-based catalyst deposited on a support consisting essentially of silica which is substantially free of other oxides, wherein the chromium-based catalyst is subjected to a heat treatment consisting essentially of, in succession, heating in nitrogen at a temperature greater than 350° C. and less than 850° C., then heating in air at a temperature greater than 350° C. and less than 850° C., and cooling down to room temperature while replacing the air with nitrogen, before the chromium-based catalyst is brought into contact with said ethylene.

2. Process for the production of ethylene polymers according to claim 1, wherein the heat treatments, in nitrogen and in air respectively, are carried out a temperature which is at least 480° C. and does not exceed 760° C.

3. Process for the production of ethylene polymers according to claim 2, wherein the heat treatments, in nitrogen and in air respectively, are carried out a temperature which is at least 530° C. and does not exceed 715° C.

4. Process for the production of ethylene polymers according to claim 1, wherein a duration of the heat treatment in nitrogen is between 10 minutes and 20 hours.

5. Process for the production of ethylene polymers according to claim 1, wherein the duration of the heat treatment in air is between 5 minutes and 6 hours.

6. Process for the production of ethylene polymers according to claim 1, wherein the support essentially consisting of silica has a BET specific surface area ranging from 100 to 800 m$^2$/g and a pore volume ranging from 0.5 to 4 cm$^3$/g.

7. Process for the production of ethylene polymers according to claim 1, wherein the chromium-based catalyst deposited on a support consisting essentially of silica contains 0.1 to 5% by weight of chromium.

8. Process for the production of ethylene polymers according to claim 1, wherein it is applied to the production of ethylene homopolymers or of random or block copolymers of ethylene and butene and/or hexene, containing at least 90 mol % ethylene.

9. Process for the production of ethylene polymers according to claim 8, wherein it is applied to the polymerization of ethylene in suspension in isobutane.

* * * * *

UNITED STATES PATENT AND TRADEMARK OFFICE
CERTIFICATE OF CORRECTION

PATENT NO. : 6,359,085 B1 Page 1 of 1
DATED : March 19, 2002
INVENTOR(S) : Olivier Lhost, Nicole Dewaele, Martine Frederickx and Joel Kaisin It is certified that error appears in the above-identified patent and that said Letters Patent is hereby corrected as shown below:

<u>Title page,</u>
Item [73], should read:
-- [73] Assignee: Solvay Polyolefins Europe - Belgium (Société Anonyme)
Brussels (BE) --

Signed and Sealed this

Seventeenth Day of December, 2002

*JAMES E. ROGAN*
*Director of the United States Patent and Trademark Office*